United States Patent [19]

Maass

[11] Patent Number: 5,339,488
[45] Date of Patent: Aug. 23, 1994

[54] SEALING AND WIPING ARRANGEMENT INCLUDING INFLATABLE CHAMBER

[75] Inventor: Klaus P. Maass, Viersen, Fed. Rep. of Germany

[73] Assignee: Draftex Industries Limited, Edinburgh, Scotland

[21] Appl. No.: 792,019

[22] Filed: Nov. 13, 1991

[30] Foreign Application Priority Data

Nov. 13, 1990 [GB] United Kingdom ................. 9024628
Dec. 5, 1990 [GB] United Kingdom ................. 9026438
Feb. 16, 1991 [GB] United Kingdom ................. 9103334

[51] Int. Cl.$^5$ ............ B60S 1/46; B60S 1/56; B60S 1/38
[52] U.S. Cl. ............ 15/250.01; 15/250.10; 15/250.02; 15/250.19; 49/377; 49/477.1; 49/502
[58] Field of Search ............ 15/250.1, 250.19, 250.01, 15/250.04, 250.06, 250.003; 49/377, 477, 502, 490, 491, 375

[56] References Cited

U.S. PATENT DOCUMENTS

| | | |
|---|---|---|
| 2,530,160 | 11/1950 | Finley . |
| 2,697,632 | 12/1954 | Shapiro ................. 15/250.10 |
| 2,721,351 | 10/1955 | Nitzel et al. ................. 15/250.06 |
| 3,452,384 | 7/1969 | Scinta . |
| 3,513,499 | 5/1970 | Miller et al. ................. 15/250.10 |
| 3,545,027 | 12/1970 | Sargeant et al. ................. 15/250.04 |
| 3,548,440 | 12/1970 | Kothari ................. 15/250.10 |
| 3,548,441 | 12/1970 | Kruger ................. 15/250.10 |
| 3,670,353 | 6/1972 | Gute et al. ................. 15/250.10 |
| 3,686,705 | 8/1972 | Parker et al. ................. 15/250.10 |
| 3,849,827 | 11/1974 | Coropolis et al. ................. 15/250.10 |
| 3,871,049 | 3/1975 | Workman ................. 15/250.04 |
| 4,105,248 | 8/1978 | Lake . |
| 4,310,943 | 1/1982 | Palma ................. 15/250.01 |
| 5,085,005 | 2/1992 | Yasukawa et al. . |

FOREIGN PATENT DOCUMENTS

| | | |
|---|---|---|
| 0036178 | 3/1981 | European Pat. Off. . |
| 0334307 | 9/1989 | European Pat. Off. . |
| 4005262 | 8/1981 | Fed. Rep. of Germany ..... 15/250.1 |
| 2555650 | 5/1985 | France . |
| 2624814 | 6/1989 | France ................. 15/250.35 |
| 2633660 | 1/1990 | France . |
| 2636027 | 3/1990 | France . |
| 0085748 | 4/1987 | Japan ................. 15/250.003 |
| WO88/09594 | 12/1988 | PCT Int'l Appl. . |
| 950062 | 2/1964 | United Kingdom . |
| 2221487 | 7/1990 | United Kingdom . |

*Primary Examiner*—Timothy F. Simone
*Assistant Examiner*—Gary K. Graham
*Attorney, Agent, or Firm*—Leydig, Voit & Mayer

[57] ABSTRACT

A sealing strip adjacent a slidable window glass in an automobile body, provides a sealing lip which is mounted on an air-tight hollow chamber having two relatively rigid sides stiffened by a metal carrier. The third side is a relatively flexible wall. Expansion of the chamber by air pressure pushes the flexible wall outwardly so that a leg pivots the lip out of engagement with the window glass. In this configuration, a further chamber can be expanded by air pressure so that a wiper is caused to move into contact with the face of the window glass. As the window glass is raised or lowered, this wiper removes moisture and prevents smearing. Partial evacuation of the chambers retracts the flexible wall, thus pulling the lip into sealing engagement with the window glass, and also causes the wiper to move out of contact with the glass. A water jet may also be provided to spray cleaning water onto the glass when in the closed position.

6 Claims, 5 Drawing Sheets

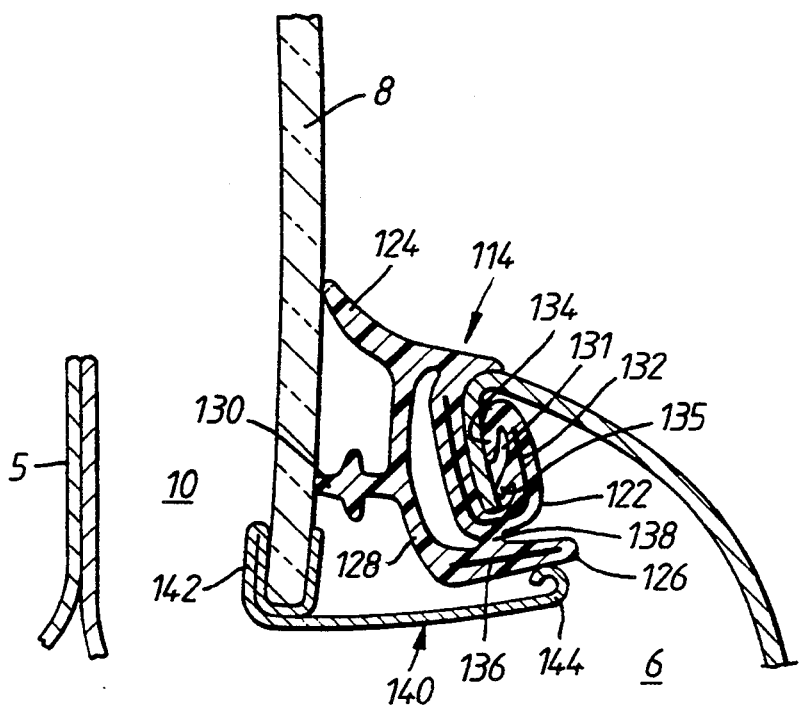
Fig.5.
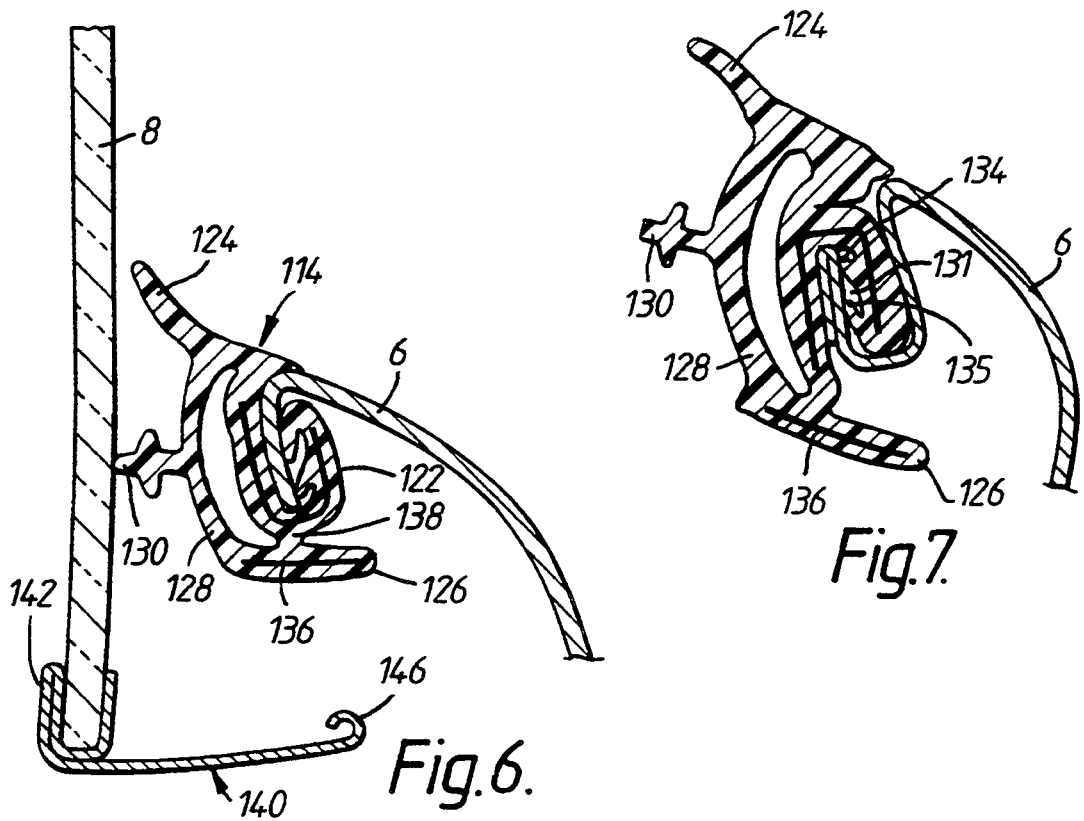
Fig.6.
Fig.7.

SEALING AND WIPING ARRANGEMENT INCLUDING INFLATABLE CHAMBER

BACKGROUND OF THE INVENTION

The invention relates to sealing and wiping arrangements. Embodiments of the invention to be more specifically described below are for sealing against, and wiping, slidable window glass panes in motor vehicle bodies.

BRIEF SUMMARY OF THE INVENTION

According to the invention, there is provided a sealing and wiping arrangement for a slidable window glass, comprising a sealing element positioned for sealingly engaging a surface of the window glass, sealing element control means for selectively moving the sealing element between positions in which it is respectively in and out of sealing engagement with the window glass, and wiping means positioned adjacent to the surface of the window glass and capable of being in wiping engagement with the window glass when the sealing element is out of sealing engagement with the window glass.

According to the invention, there is further provided a sealing arrangement for sealing against a slidable panel, comprising a flexible sealing lip, means mounting the lip adjacent to the panel, and control means for applying a mechanical force to the sealing lip for moving it between two positions in which it is respectively in and out of sealing contact with the panel, the control means comprising a force-applying member moving in synchronism with the sliding panel and producing the said force as a result of such movement.

BRIEF DESCRIPTION OF THE CHAMBER

Sealing and wiping arrangements embodying the invention will now be described, by way of example only, with reference to the accompanying diagrammatic drawings in which:

FIG. 1 is a diagrammatic cross-section through one of the sealing arrangements, in a sealing and non-wiping position;

FIG. 2 corresponds to FIG. 1 but shows the sealing arrangement in a non-wiping and non-sealing position;

FIG. 3 corresponds to FIG. 1 but shows the sealing arrangement in a wiping and non-sealing position;

FIG. 5 is a cross-section through another one of the sealing arrangement, in a sealing configuration;

Figure 4:
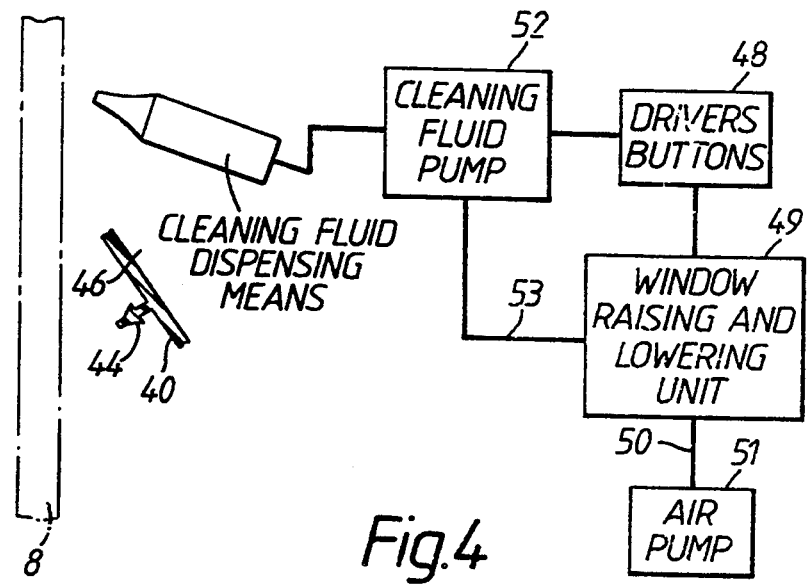
FIG. 4 is a block diagram of a window glass raising and lowering arrangement incorporating a water jet pump as well, for use in conjunction with the sealing arrangement of FIGS. 1 to 3.
Figure 8:
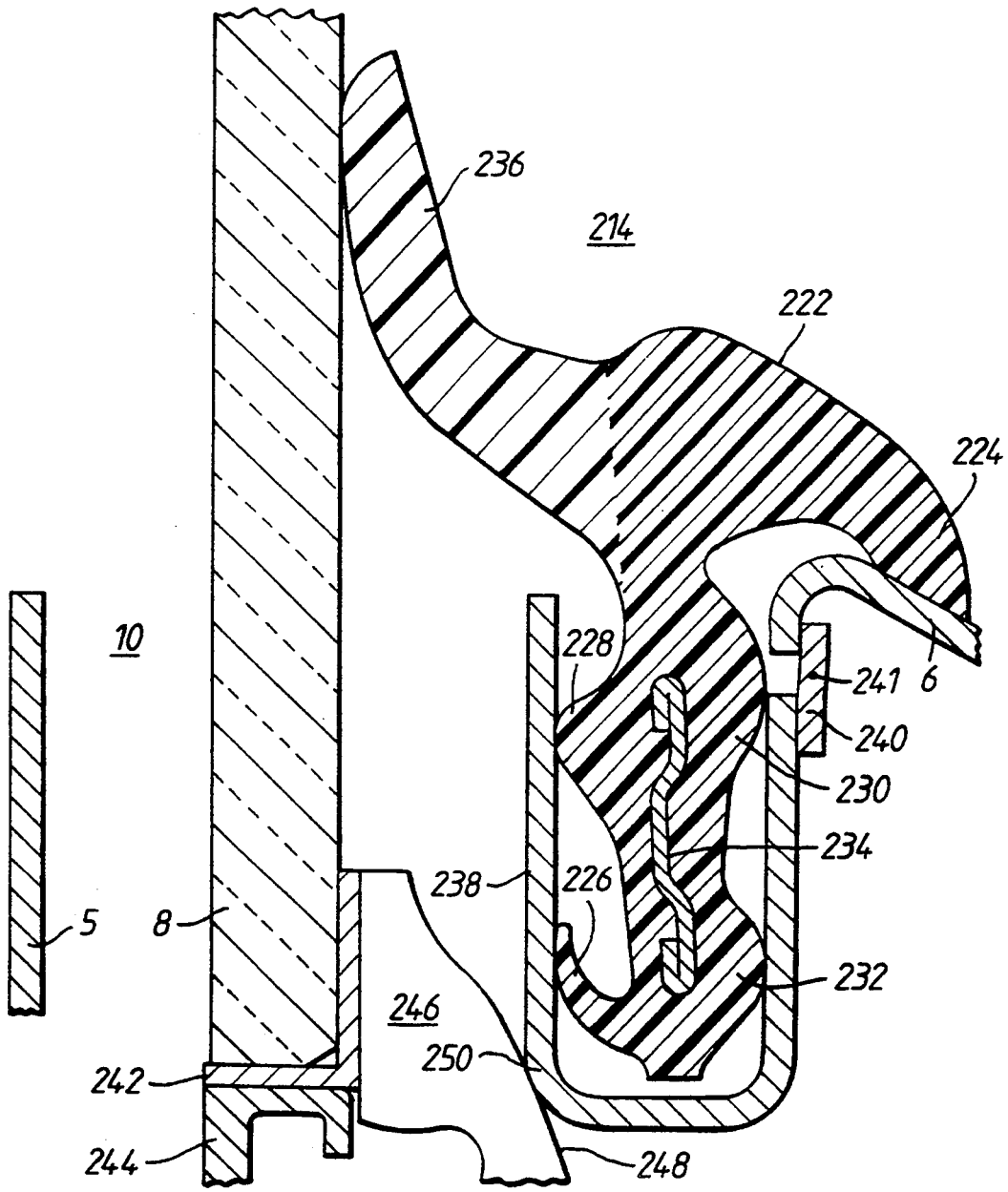
Figure 9:
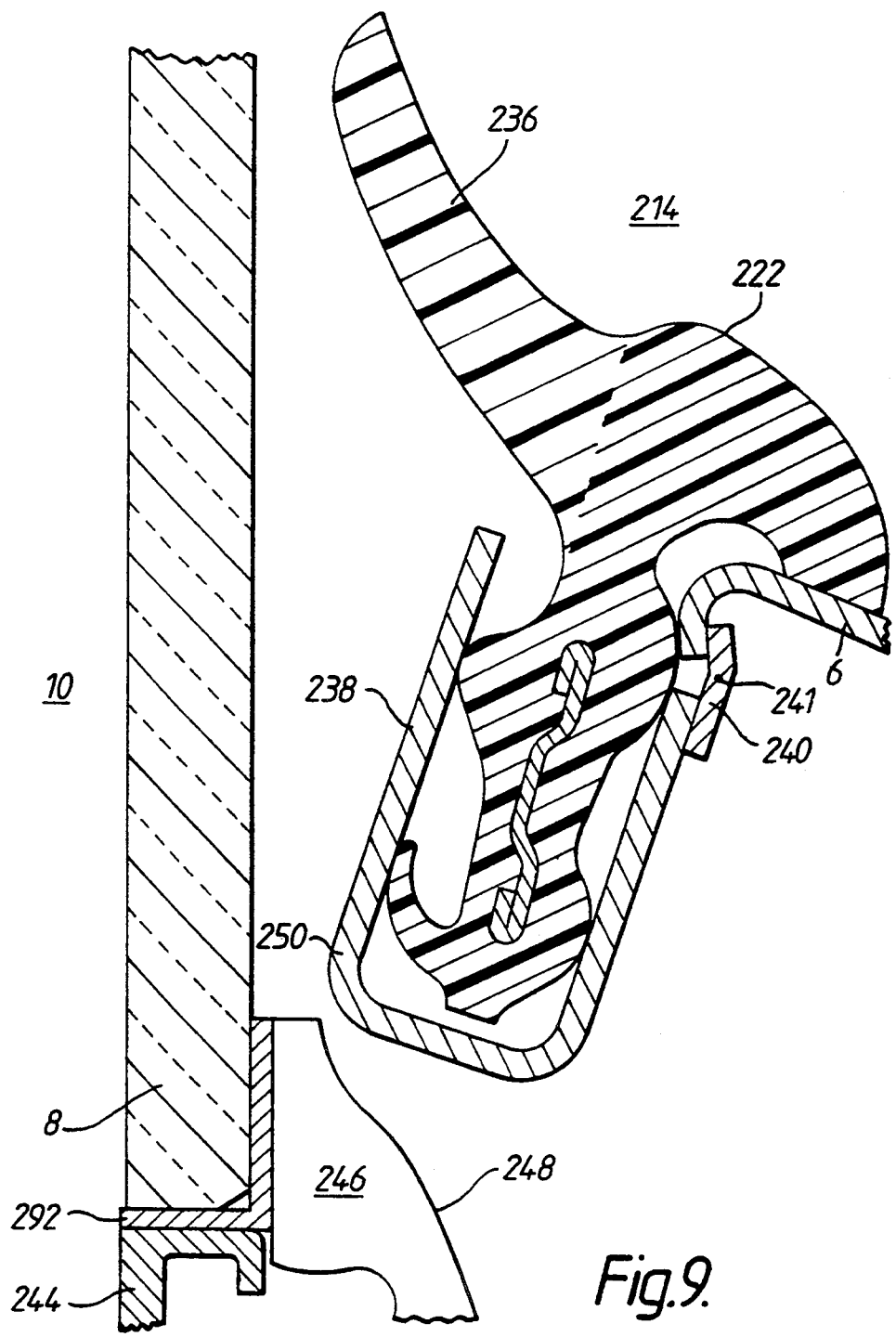

FIG. 6 corresponds to FIG. 5 but shows the sealing arrangement of that FIGURE in a non-sealing configuration;

FIG. 7 shows a modified form of the sealing arrangement of FIGS. 4 6 and 5;

FIG. 8 is a cross-section through a further one of the sealing arrangements, in a sealing configuration; and FIG. 9 corresponds to FIG. 8 but shows the sealing arrangements of FIG. 7 in a non-sealing configuration.

DETAILED DESCRIPTION OF THE INVENTION

Figure 1:
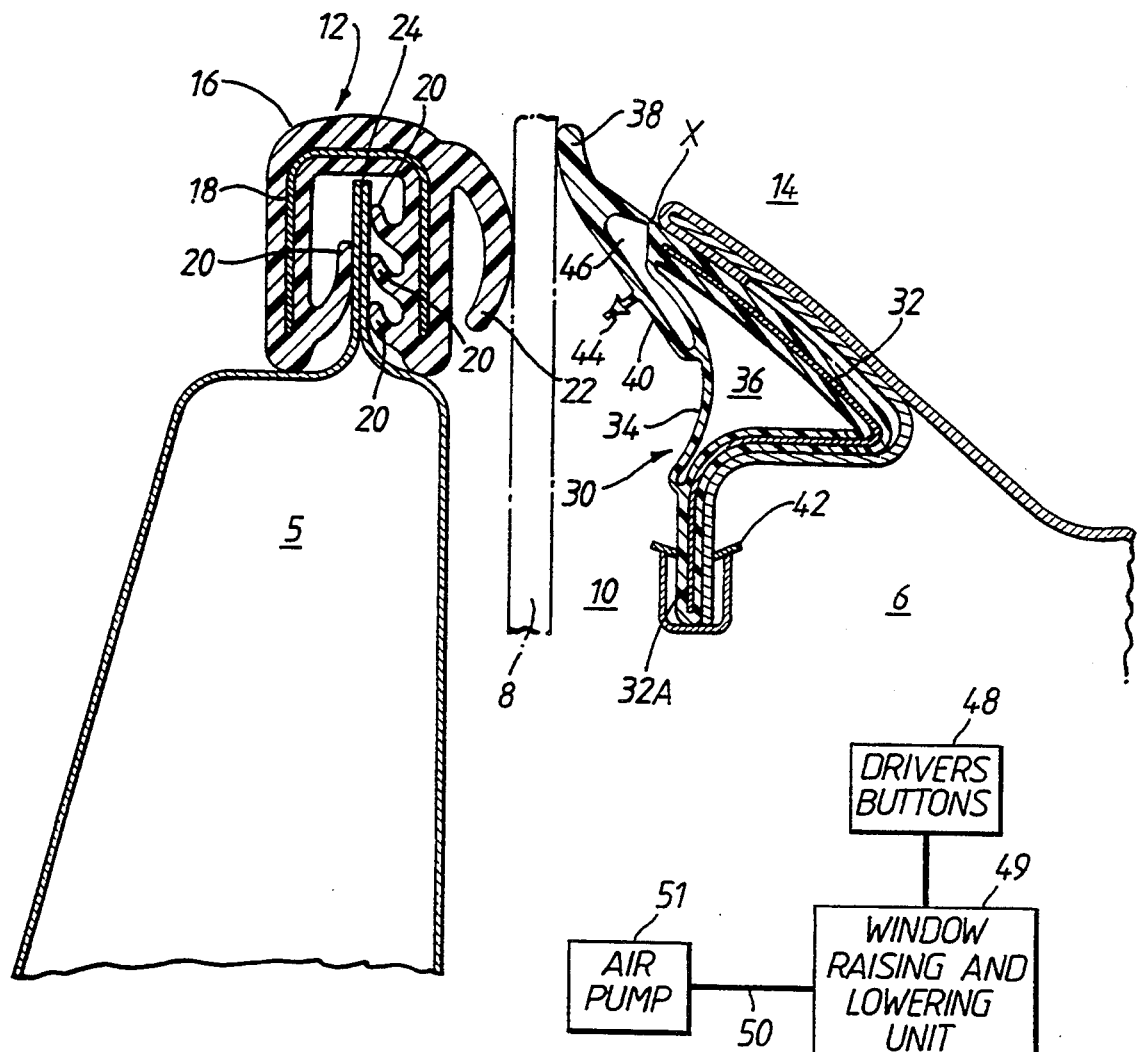

FIG. 1 shows the inner and outer panels 5,6 of the lower part of a vehicle door, whose upper part is formed to provide the normal window opening which is closable by a vertically slidable pane of glass 8, the latter being raisable from and lowerable into the hollow lower part of the door. As it is raised and lowered, the window pane 8 passes through a gap 10 between the inner and outer panels of the door.

In order to provide effective weather proof sealing at this point, the inner and outer panels of the door carry sealing strips 12 and 14.

The sealing strip 12 is of conventional form. As shown, it is in the form of a channel-shaped gripping part 16 which is formed from plastics or rubber material extruded over a channel-shaped embedded metal carrier 18. The metal carrier 18 may take any suitable form. For example, it may be a simple metal channel. Instead, it may be a slitted or slotted metal channel. It may be made up of U-shaped metal elements arranged side-by-side to define a channel and either interconnected by short connecting links or entirely disconnected. Instead, it could be made of looped wire. However, other forms of carrier are possible.

The extruded plastics or rubber material is extruded with integrally formed gripping lips 20 and a larger sealing lip 22 on the outside of the channel. The sealing strip 12 is arranged embracingly to grip a flanged joint 24 which is formed where the metal sheets forming the inner panel 5 of the door come together. In this way, therefore, the sealing strip 12 supports the lip 22 so that it bears sealingly into engagement with the slidable glass panel 8. Strip 12 is omitted from FIGS. 2 and 3.

The sealing strip 14 is mounted within a generally triangular-shaped recess 30 formed in the outer panel 6 of the door. The strip 14 comprises a metal carrier 32 which is shaped to follow the configuration of the recess 30 but with a downwardly depending part 32A. The carrier 32 may be formed from an unapertured metal blank, though could be slit or slotted. It is covered by extruded plastics or rubber material. The plastics or rubber material is extruded so as to cover and follow the shape of the metal carrier 32 but to provide, in addition, a flexible wall portion 34 defining a hollow closed chamber 36. In addition, the extruded material defines an extended relatively flexible lip 38 having a leg 40 which is anchored along approximately the centre line of the flexible wall portion 34.

The extruded plastics or rubber material need not all be the same hardness. For example, the extruded material following the shape of the metal carrier 32 may be relatively hard and stiff. However, the material defining at least the distal edge of the lip 38, and the flexible wall 34, may be softer and more flexible.

The strip 14 is fixed in position such as by metal clips or suitable fasteners spaced at intervals along the length of the strip such as positioned and shown at 42. Instead, the sealing strip could be fixed in position by any other suitable method.

The surfaces of the lips 22,38 in engagement with the glass may be covered with flock or other suitable low friction material.

The hollow interior 36 of the strip 14 is connected (by means not shown) to a vacuum pump and is sealed in an air-tight manner.

As so far described, the strips 12,14 are similar to the strips disclosed in published United Kingdom patent specification No. 2221487.

In addition, however, the sealing strip 14 carries a wiper 44 which is made of plastics or rubber material and is integrally extruded with the remainder of the plastics or rubber material. As shown, it protrudes externally from the flexible wall portion 40 towards the window pane 8 and is of arrow-head form, extending along the full width of the sealing strip which in turn extends across substantially the full width of the window pane 8. Wall portion 40 is relatively flexible and constitutes one wall of a second hollow air-tight chamber 46. The hollow chamber 46 is, like the chamber 36, connected to the vacuum pump, though is controlled separately from the hollow chamber 36.

FIG. 1 shows the seal 14 in its operative or sealing configuration. In this configuration, the hollow chamber 36 is partially evacuated by the vacuum pump. This results in the flexible wall 34 being drawn inwardly of the chamber 36 so as to assume the form illustrated in FIG. 1 and thus to exert a pulling force on the wall 40. This causes the lip 38 to pivot in an anti-clockwise direction about the pivot point X and thus to be drawn into relatively tight sealing engagement with the facing surface of the glass pane 8. A very effective weatherproof seal is therefore provided.

In addition, chamber 46 is also partially evacuated. The resultant movement of wall 40 inwardly of the chamber 46 causes the wiper 46 to be held spaced from the window pane 8.

Figure 2:
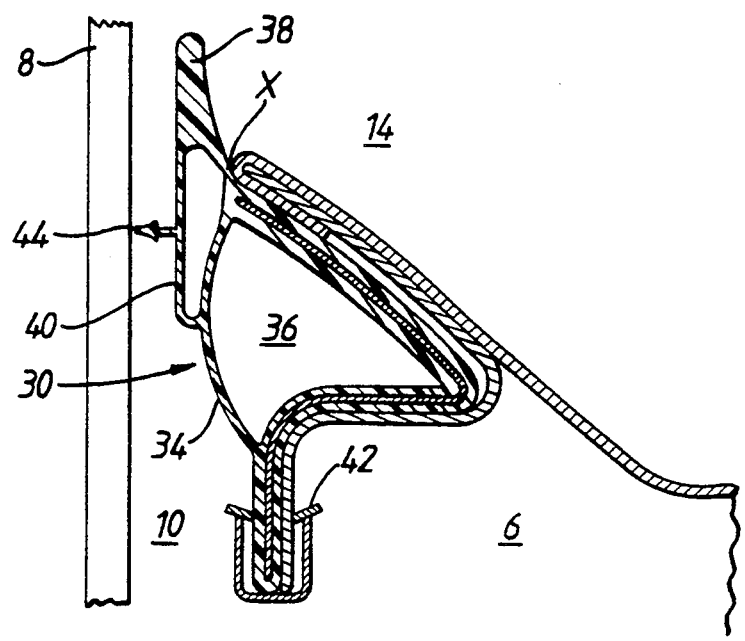

In FIG. 2, the air pressure in chamber 36 has returned to atmospheric pressure, or, possibly, has increased above atmospheric pressure. The flexible wall 34 is thus forced outwardly and lip 38 has thus pivotted in a clockwise direction about the point X and has moved clear of the window glass. However, chamber 46 is still partially evacuated so that wiper 44 is also clear of the window glass.

In this way, the sealing of the window pane 8 can be temporarily disconnected—by moving the lip 38 out of contact with the window glass 8—by operation of the vacuum pump. The window glass 8 can thus readily be raised and lowered.

Figure 3:
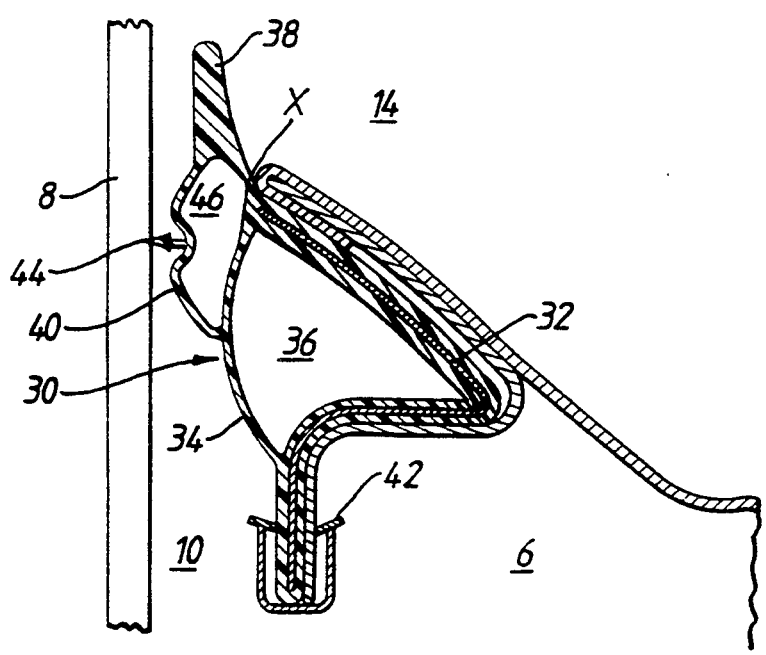

However, during such raising and lowering movement, the wiper 44 can be brought into engagement with the face of the window glass 8 to carry out a wiping action similar to that of a windscreen or windshield wiper and clears the glass of moisture. This is shown in FIG. 3 which shows the situation when the chamber 46 is returned to atmospheric pressure or, possibly, has increased above atmospheric pressure. Wall 46 is thus pressed outwardly and places the wiper 44 into wiping engagement with the window glass. Because the wiper 44 is mounted on the flexible wall 40, it can flex upwardly with the glass as the glass moves upwardly and downwardly with the glass when the glass moves downwardly. In this way, therefore, the face of the window glass is cleared of moisture and smears.

When window raising, lowering and wiping has been completed, the vacuum pump is operated so as partially to evacuate the hollow chambers 36 and 46. In the manner explained, the lip 38 thus moves back into sealing engagement with the window glass and wiper 44 moves away from the window glass.

Therefore, there is minimum resistance to movement of the window glass and effective cleaning of the window glass during such movement, and maximum sealing effect when the movement stops.

The operation of the vacuum pump could be controlled manually. Instead, however, it can be controlled in sequence with the window raising and lowering mechanism (whether such mechanism is manual or powered). As indicated in FIG. 1 for example, it could be controlled automatically in synchronism with raising and lowering of the window, via driver's push buttons 48 controlling the window raising and lowering unit 49 and a connection 50 from the latter to a pump 51 for controlling the air pressure in the chambers 36 and 46 (the connections from the pump 51 to the chambers 36 and 46 are omitted for clarity). In this way, operation of the air pump 51 would be automatically controlled via the driver's push buttons 48 so as to cause the lip 38 to be moved out of sealing contact with the window glass 8 when the window glass slides and to be moved back into sealing contact with the glass when it ceases to slide. The air pump 51 could similarly control the pressure in the chamber 46 so as to cause the wiper 44 to move into wiping contact when the glass slides in and out of wiping contact when the glass stops. Instead, however, the movement of the wiper 44 could be controlled via a separate driver's button and a direct connection to the pump 51.

In a modified version, a strip similar to the strip 14 but of mirror-image form could be positioned on the inside of the window glass 8 instead of strip 12.

Advantageously, the sealing lip 38 incorporates an electrical heating wire by means of which it and the window can be de-iced. Instead, warm air could be introduced to the window glass for the same purpose.

In a modification, a washer jet is suitably positioned so as to direct a jet of water at the outer face of the window glass, adjacent to the sealing lip 38. The jet of water is used to wash the window glass and can be controlled so as to be operable (either manually, such as by a button located adjacent to the control for electrically operating the window, or automatically) when the window is closed. The washer jet could be adjacent to the strip, or could be positioned elsewhere such as incorporated in the housing of the external rear view mirror when for a front side window of a vehicle.

FIG. 4 shows the driver's push buttons 48 for controlling the window raising and lowering unit 49 and the connection 50 from the latter to the pump 51 for controlling the air pressure in the chambers 36 and 46 in the manner described above. In addition, the driver's buttons 48 include an additional button by which the driver can control the water jet pump 52 for the water dispensing means.

Advantageously, the positions of the lip 38 and the wiper 44, together with the operation of the water jet, would all be interlinked with the movement of the window glass. Thus, when the window glass is in the closed position, the lip 38 would be in contact with the window glass and the wiper 44 would not be in contact. With the window closed, the washer jet can be operated via the driver's push buttons 48. The lip 38 would then be withdrawn from the window glass and the window then be lowered. The wiper 44 would then be placed in contact with the glass 8 (as shown in FIG. 3) and the window glass raised to clean the glass. If the window movement was stopped, either before it reached the fully open position, or when it has reached that position, the lip 38 would then be moved back into contact with the window glass and the wiper 44 withdrawn (the FIG. 1 situation). The washer would be prevented from being operated in the open or partially open position of the window glass, by means of a connection 53 from the unit 49 to the pump 52.

The construction of the sealing strip 14 is shown merely by way of example. Other forms are possible, such as, for instance, the form shown in FIGS. 3 and 4 of the above-mentioned published United Kingdom patent specification No. 2221487, but modified so as to carry a wiper corresponding to the wiper 44.

In a further modification, the wiper 44 need not be attached to the strip 14. Instead, it could be positioned separately from the strip 14 and either arranged to be permanently in contact with the window glass 8 or moved into and out of such contact by separate means.

Although the arrangements illustrated have shown the lip 38 and the wiper 44 as being moved by the effect of changing air pressure on flexibly-walled chambers, alternative arrangements are possible in which the lip and/or the wiper are moved by some other means such as electrically or magnetically or electro-magnetically.

Referring to FIG. 5, the seal on the body panel 5 is omitted but the seal 114 on the body panel 6 will now be described (the body panel 5 is itself omitted in FIG. 6).

The seal 114 is made of flexible material such as plastics or rubber material and is preferably manufactured by an extrusion process. It comprises a main or gripping portion 122 which may be relatively stiff and which carries a lip 124 which is preferably relatively flexible. In addition, the gripping portion 122 is integral with a cam follower portion 126 which is integrally connected to the lip 124 by a relatively flexible web 128.

Web 128 carries an integrally extruded wiper 130.

The gripping portion 122 defines a channel 131 which embraces an edge of the body panel 6 so as to hold the seal 120 firmly in position. To aid this gripping process, the gripping portion 122 has embedded within the flexible material a channel-shaped metal core or carrier 132. The metal carrier 22 may take any suitable form. It may, for example, be in the same form as the carrier 18 of FIG. 1.

In addition, the material defining the channel 131 can be arranged to include integrally extruded lips 134,135, these lips extending inwardly of the channel from one side wall thereof so as to engage and frictionally grip the adjacent face of the edge of the panel 6; more or fewer lips can be provided and lips can be provided on both sides of the channel.

The cam follower 126, which may be also extruded of relatively stiff plastics or rubber material, has embedded within it a reinforcing strip 136 which may take the form of a metal strip which may be unapertured or provided with slits or slots along its length. However, this metal reinforcing strip is not essential if the plastics or rubber material of the cam follower portion 126 is sufficiently stiff on its own.

The neck of the extruded material between the gripping part 122 and the cam follower portion 126, at 138, is arranged to act as a hinge portion, as will be explained.

As shown in FIG. 5, the window pane 8 carries along its bottom edge a stiff cam member 140, This has a channel-shaped part 142 which is firmly attached to the bottom edge of the window pane. The cam member 140 may be made of metal, for example, with the channel-shaped portion 142 being sized so as firmly to grip the window pane 8, possibly being secured to it by a suitable adhesive. Instead, the cam member 140 could be made of extruded plastics or rubber material with embedded metal reinforcement, being secured to the window pane in the same way. At its other end, the cam member 140 has a head 144 which, as illustrated in FIG. 5, engages the downwardly facing surface of the cam follower 126.

As shown in FIG. 5, in which the window is in the raised position, the cam 140 applies, through its head 144, such force to the cam follower 126 that the latter, being pivotted in an anti-clockwise direction about its hinge 138 on the gripping part 122, exerts a downward pulling force on the lip 124 via the web 128. This pulls the lip 124 into firm sealing engagement with the window pane 8.

In this configuration, the wiper 130 is also in firm contact with the window pane.

FIG. 6 shows the configuration when the window pane 8 commences to lower. As the cam 140 moves out of contact with the cam follower 126, the cam follower 126 moves in a clockwise direction about the hinge 138, and the lip 124 moves out of sealing contact with the window pane. This movement of the cam follower 126 and the lip 124 (and, of course, the web 128 as well) occurs as a result of the natural resilience within the flexible material, the design and extrusion process being arranged such that the natural relaxed position into which the material resiles is that shown in FIG. 6.

In this configuration, the wiper 130 is still in contact with the window pane 8.

The window pane 8 can now be freely lowered, without its movement being impeded by contact between the lip 124 and the window pane. During this movement, the wiper 130 wipes the corresponding face of the window pane and cleans it.

FIG. 7 shows a modified configuration in which parts corresponding to those in FIGS. 5 and 6 are similarly referenced. The configuration shown in FIG. 7 differs from that shown in FIGS. 5 and 6 in that the body panel 6 is of modified shape, defining a channel formed in the metal of the panel, the form of the gripping portion 122 being correspondingly modified. FIG. 7 omits the body panel 5, the glass 8 and the cam 140.

Other modified forms of construction are of course possible.

The seal 120, with the embedded metal carrier 132 and the embedded metal strip 136, may be extruded by a known cross-head extrusion process, and this extrusion process may be such that different portions of the extruded plastics or rubber material have different hardnesses.

An advantage of the embodiment disclosed is that the cam 140 can block an attempt by a thief to gain access to the vehicle by inserting an implement into the interior of the lower part of the door with a view to releasing the door lock.

In FIG. 8, the seal on the body panel 5 is omitted, but the seal 214 on the body panel 6 will now be described.

The seal 214 is made of flexible material such as plastics or rubber material and is preferably manufactured by an extrusion process. It comprises a main body portion 222 which may be made relatively stiff and which carries a lip 224, a lip 226, and shoulders 228,230 and 232.

For strengthening purposes, it also includes a longitudinally extending metal reinforcement or carrier 234. In addition, the body portion 222 is integrally extruded with a further lip 236 which, although integrally extruded, may be made of softer material than the body portion. The strip 222 is mounted in a metal channel 38 which extends across the width of the opening 10. The size of the body portion 222 is such that it is a close fit within the channel 238 which thus rigidly supports it. In the position shown, the channel 238 is supporting the strip 214 so that the lip 236 bears in sealing engagement with the outside face of the window pane 8.

The channel 238 is connected to the body panel 6 of the outside of the door by a spring-steel metal strip 240, which extends along the length of the gap 10. The metal strip 240 acts as a hinge, permitting the channel 238 to pivot relative to the body panel 6 about an axis 241. The strip 240 also acts as a spring and biases the channel 238 in a clockwise direction relative to the pivot 241.

In FIG. 8, the window pane 8 is in its closed or fully raised position. The lower edge of the window pane 8 has attached to it, by adhesive, an L-shaped member 242, preferably made of metal. On its underside, the member 242 has attached to it a support 244 for the window pane which is attached to the window pane raising and lowering mechanism (not shown). Mounted on the side of the member 242 is a cam member 246 which again preferably extends along the length of the gap 10 and may be made of rigid plastics material. The cam 246 has a camming surface 248 which, in the fully raised position of the window pane 8 shown in FIG. 8, bears against the corner 250 of the channel 238 and holds the channel in the attitude shown so that the lip 236 bears sealingly against the window pane 8.

FIG. 9 shows the window pane 8 in a partly lowered configuration. As the pane 8 is lowered by the window raising and lowering mechanism, the cam member 246 is carried downwardly with it and moves out of contact with the channel 238. This enables the inherent bias in the spring steel metal strip 240 to pivot the channel 238 in a clockwise direction about the pivot point 241. The lip 236 thus moves out of sealing engagement with the face of the window pane 8. The window pane 8 can thus readily be lowered without any resistance caused by frictional engagement of the lip 236 against it.

When the window pane 8 is once more raised, eventually the cam member 246 will make contact again with the channel 238 and will bring the strip 214 back to the attitude shown in FIG. 8 where it once more seals against the window pane.

The body panel 5 on the inside of the window pane can carry a strip having generally the same configuration as the strip 214 and, like the strip 214, mounted within a pivotted channel corresponding to the channel 238. In that case, the window pane 8 would carry a further cam member corresponding to the cam member 246 but mounted on the inside of the window pane, opposite the cam member 246, so as to move the further strip into and out of contact with the inside face of the window pane. Instead, however, the body panel 5 could carry a sealing strip of known form, permanently in contact with the window pane.

Although the movement of the channel 238 has been illustrated as being controlled by a cam member 246 directly carried by the window pane 8, it could instead be controlled by mechanical interaction (such as by a cam) with part of the window raising and lowering mechanism. This would avoid the need to attach a cam member directly to the window pane. In addition, it would enable the channel 238 to be brought back into the sealing configuration (as shown in FIG. 8) when the window pane 8 is fully lowered (this could be achieved by a second cam arrangement becoming active when the window pane is fully lowered). Therefore, gap 10 would be sealed both when the window pane is fully closed and when it is fully open.

Other arrangements for supporting the seal 214 and permitting it to pivot may be used instead of that shown.

What is claimed is:

1. A sealing and wiping arrangement, for a slidable window glass, comprising support means, means mounted on the support means and defining a first hollow chamber for receiving a variable-pressure fluid therewithin, the first hollow chamber undergoing shape alteration in response to altering the pressure of the fluid, the chamber having at least one rigid wall and a first flexible wall which moves with the shape alteration of the hollow chamber, a sealing element, flexible mounting means flexibly mounting the sealing element on the said rigid wall and positioning the sealing element for sealingly engaging a surface of the window glass, the flexible mounting means mounting the sealing element for movement between a sealing position in which it is in sealing engagement with the window glass and a non-sealing position in which it is out of sealing engagement with the window glass, a second flexible wall mounted outside the first chamber and connected between the first flexible wall and the sealing element whereby movement of the firs flexible wall in response to shape alteration of the first chamber causes the second flexible wall to transmit a mechanical force to the sealing element so as to cause it to move on its flexible mounting means between the sealing and non-sealing positions, the second flexible wall defining a portion of a second hollow chamber which is positioned on the outside of the first hollow chamber and which receives a variable-pressure fluid therewithin, the second hollow chamber undergoing shape alteration in response to alteration of the pressure of the fluid, wiping means, means mounting the wiping means on the second flexible wall and outside the said chamber, the wiping means being mounted adjacent to the surface of the window glass and movable between a wiping position in which it is in wiping engagement with the window glass and a non-wiping position in which it is not in wiping engagement with the window glass, the shape alteration of the second chamber when the sealing element is in the non-sealing position causing the wiping means to move between the wiping and non-wiping positions, sealing element control means selectively operable to move the sealing element between the sealing and non-sealing positions, the sealing element control means comprising means for altering the pressure of the fluid within the first chamber, and wiping means control means selectively operable to move the wiping means between the wiping and non-wiping positions, the wiping means control means comprising means for altering the pressure of the fluid within the second chamber.

2. An arrangement according to claim 1, including window glass control means for controlling the sliding movement of the window glass, means interconnecting the window glass control means with the sealing element control means whereby the sealing element is moved into sealing engagement with the said surface when the window glass is stationary and is moved out of such sealing engagement when the window glass is sliding.

3. An arrangement according to claim 1, in which the sealing element is a lip extending substantially linearly along the said surface.

4. An arrangement according to claim 1, in which the wiping means extends substantially linearly along the said surface.

5. An arrangement according to claim 1, including cleaning liquid dispensing means operable to dispense a supply of a cleaning liquid onto the said surface of the window glass adjacent the wiping means.

6. An arrangement according to claim 5, including means preventing operation of the cleaning liquid dispensing means unless the window glass is in a closed position.

* * * * *